United States Patent [19]

O'Brien et al.

[11] Patent Number: 5,051,157

[45] Date of Patent: Sep. 24, 1991

[54] SPACER FOR AN ELECTROCHEMICAL APPARATUS

[75] Inventors: Robert N. O'Brien, Victoria, Canada; Kalathur S. V. Santhanam, Bombay, India

[73] Assignee: University of Victoria, Victoria, Canada

[21] Appl. No.: 519,910

[22] Filed: May 7, 1990

Related U.S. Application Data

[63] Continuation-in-part of Ser. No. 259,871, Oct. 19, 1988, abandoned.

[30] Foreign Application Priority Data

Feb. 29, 1988 [CA] Canada ................................ 560114

[51] Int. Cl.$^5$ .......................................... B23H 3/00
[52] U.S. Cl. .............................. 204/129.1; 204/283; 204/295; 204/296; 204/279; 429/10; 429/142; 429/254; 422/186.01
[58] Field of Search ................. 429/10, 142, 251, 254; 204/129.1, 129.65, 283, 295, 296, 279; 422/186.01; 210/500.1, 500.21, 500.25, 500.27

[56] References Cited

U.S. PATENT DOCUMENTS

| 3,597,278 | 8/1971 | von Brimer | 136/136 |
|---|---|---|---|
| 3,890,224 | 6/1975 | Weiss et al. | 210/30 |
| 4,260,874 | 4/1981 | Will | 204/295 |

FOREIGN PATENT DOCUMENTS

| 0935780 | 10/1973 | Canada | 204/8 |
|---|---|---|---|
| 1041165 | 10/1978 | Canada | . |
| 1056904 | 6/1979 | Canada | . |
| 1089408 | 11/1980 | Canada | . |
| 60-46400 | 3/1985 | Japan | . |

OTHER PUBLICATIONS

Eklund et al., "Visualization of the Concentration Profiles in the Lead Acid Battery by Moiré and Multiple Beam Interferometry", Journal of the Electrochem. Soc., Oct. 1990, pp. 1–6.

O'Brien et al., "Electrochemical Hydrodynamics in a Magnetic Field With Laser Interferometry, Influence of Paramagnetic Ions", Journal of Applied Electrochemistry, 20, 1990, pp. 427–437.

O'Brien et al., "Pulsed Electrodeposition of Zinc in Magnetic Fields: Diffusion Layer Relaxation Followed by Laser Interferometry", Journal of Applied Electrochemistry, 20, 1990, pp. 781–785.

O'Brien et al., "On the Hydrodynamics of the Polarographic Maxima of the First Kind"; Canadian Journal of Chemistry; vol. 54, No. 3; 1976; pp. 402–410.

*Primary Examiner*—John F. Niebling
*Assistant Examiner*—Kathryn Gorgos
*Attorney, Agent, or Firm*—Harry M. Weiss

[57] ABSTRACT

An ion-permeable spacer is provided for an electrochemical apparatus. The spacer comprises a perforated or ion-permeable, relatively-thin, synthetic plastic material sheet having two opposed faces and having a plurality of magnets completely embedded in both opposed faces thereof and including at least four vertically-upwardly slanting slits extending at an upwardly-sloping angle along each of the two opposed faces and also extending transversely through the spacer between the two opposed faces, the slits having a particularly defined width and disposed at a particular angle, thereby to provide greater combined flow and mixing of electrolyte through the spacer.

43 Claims, 4 Drawing Sheets

SPACER FOR AN ELECTROCHEMICAL APPARATUS

RELATED INVENTION

This application is a continuation-in-part of application Ser. No. 259,871 filed Oct. 19, 1988, now abandoned, the entire contents of which is expressly incorporated herein by reference.

BACKGROUND OF THE INVENTION (i) Field of the Invention

This invention relates to separator plates for use in electrochemical apparatus, e.g. batteries, electrodeposition apparatus, electrorefining apparatus or electromachining apparatus. The invention also relates to improved such apparatus incorporating such separator plates.

(ii) Description of the Prior Art

Some typical patents directed to storage batteries include the following:

Canadian Patent 1,041,165, issued Oct. 24, 1978, to Yuasa Battery Company Ltd., provided a lead-acid-type storage battery with embossed microporous separators. Each separator comprised microporous material made of synthetic resin and a macroporous base material. The separator had embossed parts that were poreless or substantially poreless.

U.S. Pat. No. 3,505,113, patented Apr. 7, 1970, by V. Merten, et al, provided a rechargeable energy conversion system utilizing zinc anodes and oxygen-providing cathodes. An aqueous alkali metal hydroxide electrolyte was circulated through the interior of the electrochemical cells and then exteriorly thereof, where it was cooled. The circulating electrolyte removed the zinc oxide reaction products from the cells during discharge, and these reaction products were separated from the electrolyte stream and stored exteriorly of the cells until the system was recharged.

U.S. Pat. No. 3,597,278, patented Aug. 3, 1971, by J. W. Von Brimer, provided an electrolytic cell comprising a positive electrode and a negative electrode, an electrolyte in association with said electrodes, and means for creating a magnetic field within the cell for circulating the electrolyte when current is flowing between the electrodes. One disclosed such means included permanent magnets extending between the plates forming the cell electrodes, to establish lines of the flux extending generally parallel to the plates and serving to maintain the plates in a spaced apart relation. The plates were microporous plastic to permit the electrolyte to permeate them, with permanent pagnets encased within the plastic.

U.S. Pat. No. 3,772,085, patented Nov. 13, 1973, by H. K. Bjorkman provided a diaphragmless secondary cell comprising a cell frame having an inlet means and an outlet means, a metal electrode held to the frame, a porous, supporting, conductive halogen electrode joined to the frame and spaced from the metal electrode, thereby forming an intercell spacing. The cell frame outlet means was positioned between the metal electrode and the halogen electrode of the cell. Means were provided for passing an aqueous metal halide electrolyte containing halogen into the cell frame inlet means to contact the halogen electrode by passing the electrolyte through the porous halogen electrode, into the intercell spacing and out the cell frame outlet means. A second cell frame inlet means was positioned adjacent to the metal electrode and spaced between the metal electrode and the halogen electrode in the intercell spacing and inclined at an angle of 5° to 30° from the metal electrode. Means were provided for passing electrolyte through the second inlet means towards the halogen electrode so as to produce a total electrolyte flow at a low Reynolds number adjacent to the metal electrode and to create a boundary layer of electrolyte thereon. Such boundry layer limited contact of the halogen with the metal of the electrode.

U.S. Pat. No. 4,042,754, patented Aug. 16, 1977, by D. Borells provided a battery comprising an outer housing bounding an internal battery compartment, and a cooperating negative and positive pair of battery plates disposed in spaced-apart relation in the battery compartment so as to subdivide the battery into a central electrolyte mixing compartment and separate first and second electrolyte inlet compartments on opposite sides thereof. Each negative and positive battery plate was comprised of a porous construction material for permitting the continuous flow of electrolyte components from the inlet compartments into the mixing compartment in accordance with a selected specific gravity of the electrolyte mixture in the central compartment optimum for electrical conductivity. The maintaining of the electrolyte mixture at the selected optimum specific gravity promoted effective charging and discharging of said battery plates.

U.S. Pat. No. 4,072,802, patented Feb. 7, 1978, by K. Murata, et al, provided a lead-acid storage battery comprising a container, at least one set of battery plates, one plate of the set being a positive plate and another being a negative plate, and a microporous separator interposed between the positive and negative plates. The microporous separator was a microporous sheet of heat-meltable, synthetic-resin containing thin film and having submicron micropores. The microporous sheet had a plurality of independent limited embossed parts projecting outwardly from the separator toward the positive plate. The projecting embossed parts were connected with projecting embossed channels which helped gas formed in the cell to escape upward out of the cell. The height of the projecting embossed channels were lower than the height of the projecting embossed parts, and the pores of the embossed parts were at least partially closed.

U.S. Pat. No. 4,346,150, patented Aug. 24, 1982, by Exxon Research Engineering Co., provided a cell construction including a stack of cells each comprised of an integral separator and spacer disposed between adjacent electrodes. Each electrode comprised a plastic sheet having a coextruded, electrically-conductive mid-portion and electrically non-conductive side portions.

U.S. Pat. No. 4,396,689, patented Aug. 2, 1983, by Exxon Research and Engineering Co. provided a cell construction including a stack of cells each comprised of an integral separator and spacer disposed between adjacent electrodes. Each electrode comprised a composite plastic sheet having a coextruded, electrically-conductive mid-portion and electrically non-conductive top and bottom side portions. The separator-spacer and the sheet electrodes were assembled by male and female connections which were hollow and which formed fluid conduits for the cells.

Some typical patents directed to electrolysis apparatus include the following:

Canadian Patent 1,056,904, patented June 19, 1979, by Yardney Electric Corporation, provided a separator for alkaline electrochemical cells having zinc negative electrodes. The separator comprised rare earth inorganic hydroxides in finely-divided solid particulate form dispersed uniformly within a shape-retaining, non-reactive matrix.

U.S. Pat. No. 3,522,162, patented July 28, 1970, by R. C. Davies, proposed a method and apparatus to cause migration of ions or electrically-charged particles in a solution by passing a body of solution through, and cutting across, a magnetic field. The magnetic field was generally radial and containers were spun through that field. The source of electrical energy used for obtaining an electrolytic reaction and for using migration of ions to the region at which electrolytic reaction took place was the movement of an electrolyte with respect to a magnetic field.

U.S. Pat. No. 4,093,533, patented June 3, 1978, by The Dow Chemical Company provided asbestos diaphragms for use in electrolytic chlor-alkali cells. The diaphragms were prepared by using polymeric fluorocarbons as binders for mixtures of chrysolite asbestos and crocidolite asbestos.

U.S. Pat. No. 4,165,271, patented Aug. 21, 1979, by Olin Corporation, provided a diaphragm for use in the electrolysis of alkali metal chloride brines in electrolytic diaphragm cells. The diaphragm was comprised of a support fabric impregnated with a non-fibrilic active component containing silica. The support fabric had a non-continuous coating of an electro-conductive metal on one side of the fabric.

U.S. Pat. No. 4,346,150, patented Aug. 24, 1982, by R. J. Bellows, et al, provided an electrochemical construction comprising a stack of cells each comprised of an integral separator and spacer disposed between adjacent electrodes, each comprised of a plastic sheet having a microporous center and a non-porous border and having a coextruded, electrically-conductive mid-portion and electrically non-conductive side portion.

U.S. Pat. No. 4,585,539, patented Apr. 29, 1986, by G. I. Edsen, provided an electrolytic reactor for the treatment of chemical species dissolved in electrically conductive solutions. That reactor included a sealed container and a microporous, electrically-insulating septum subdividing the container into first and second solution chambers. First electrode means were provided in the first solution chamber and second electrode means were provided in the second solution chamber. Static surface extension means, composed of discrete, particulate bodies, packed at least one of the solution chambers, in electrically conductive contact with the electrode in the chamber. First conduit means, including at least one inlet port and one discharge port were provided for the introduction of a first electrolyte into the first chamber and the withdrawal of electrolyte therefrom and second conduit means, including at least one inlet port and one discharge port were also provided for the introduction of a second electrolyte into, and the withdrawal thereof from the second chamber. Current supply means imposed a direct electrical potential across the first and second electrode means. Current reversing means were provided for reversing the potential applied across the first and second electrode means.

U.S. Pat. No. 4,675,259, patented June 23, 1987, by N. Shuster, et al, provided an electrochemical cell including a consumable anode defining a face and a cathode spaced from the anode face and defining a cathode face opposing the anode face, the cathode face and the anode face defining an electrolyte flow channel therebetween, the flow channel having an inlet and an outlet. Each of the anode face and the cathode was adapted to be in direct contact with an aqueous alkaline electrolyte during operation of said cell. A plurality of baffles was disposed in the electrolyte flow channel in contact with the anode and with the cathode face and defined an electrolyte flow path having a directional vector component perpendicular to a sufficient component of the flow vector of the electrolyte to increase the speed at which the electrolyte passed through the flow channel and across the anode face at any selected volumetric flow rate, as compared to an otherwise identical cell without such baffles.

Typical patents relating to electro-refining or electro-machining include the following:

Canadian Patent 935,780, patented Oct. 23, 1973, by The Mead Corporation, provided a method and apparatus to produce uniform apertures for use in a non-contact pinging system. An orifice plate was provided with pre-formed apertures or holes, the diameter of the holes being at least the size of the predetermined diameter desired. Liquid was supplied to the orifice plate under pressure. The liquid supplied was an electrolytic solution, and was flowed through each aperture or hole in the orifice plate. Suitable stimulation was provided at the orifice plate to cause uniform drop formation. After passing through the aperture, the liquid impinged on a contact bar. A potential difference was established between the bar and the orifice plate, with the electrolytic liquid completing the circuit so long as the unbroken filament reached the contact bar. As a result, metal from the electrolyte liquid was caused to deposit or plate on the wall of the apertures. An unbroken filament of liquid issued from the apertures, but had the tendency of subsequently breaking into drops. As the deposition built up on the inside of the aperture and decreased the diameter of the aperture, the filament length shortened, eventually NOT reaching and impinging on the contact bar. As a result, the electric circuit was opened, and deposition inside the apertures ceased.

Canadian Patent 1,089,408, patented Nov. 11, 1980, by Ultra Centrifuge Nederland N.V., provided an apparatus for removing material from electrically-conducting substances by electrochemical attack. The apparatus included a flow-guiding, non-conducting template which was equipped with one or more liquid inlets, liquid outlets, and efflux channels inside the template. The apparatus included a source of direct current, the negative pole of which was connected by way of a pulse generator which supplied current pulses of 5 to 20 milliseconds and a resistor which was connected in parallel to a current integrator, and to electrodes, which were provided in the efflux channels in the flow guiding template at a distance from a work piece to be machined. The positive pole of the source of direct current was connected to the work piece.

Typical patent directed to fuel cell constructions include the following:

U.S. Pat. No. 3,881,956, patented May 6, 1975, by T. S. Williams, provided a parallel electrolyte feed, parallel electrolyte drain stacked array of fuel cells with a common electrolyte supply and common electrolyte drain electrically connected in series. Such structure also included a plate at an end of the stack with transverse conduits therein, and a first imperforate electrolyte feed conduit running along a marginal edge of the stacked cells essentially parallel to the direction of stacking and interconnecting the common electrolyte supply with an end of a first one of said transverse passages to define therewith an elongated electrolyte feed passage bypassing the cells in the stack. A branched electrolyte feed channel ran along a marginal edge of the stacked cells and had a feed end connected to an end of the first transverse conduit to define a branched passage receiving electrolyte from the first transverse conduit and supplying the electrolyte to the cells in parallel. A second imperforate electrolyte drain conduit ran along a marginal edge of the stacked cells essentially parallel to the direction of stacking and interconnected the common electrolyte drain with a second one of the transverse passages to define therewith an elongated electrolyte drain passage bypassing the cells in the stack. A branched electrolyte drain channel ran along a marginal edge of the stacked cells and had a drain end connected to an end of the second transverse conduit and drained electrolyte from the cells in parallel.

U.S. Pat. No. 4,037,022 patented July 19, 1977 by J. Cheros, provided a fuel cell block comprising sealed compartments for fluid reactants and electrolyte, these compartments being delimited by plates, for example, the electrode of the fuel cell. At least some of the plates delimiting the compartments were subjected to magnetic attractive forces balancing the action of the pressing forces exerted on these plates by the fluid contained in the compartments.

A problem which has been found to exist in attempting to maximize the electric current produced by storage batteries (as described hereinabove) is the internal resistance of the cell. It would, therefore, be desirable to provide a structure for use in such a cell which would result in a reduction of the internal resistance and, hence, would provide more electric current.

However, a problem in electrolysis cells (as described above) not addressed by the prior art, is the adequate stirring of the electrolyte. The prior art technique of stirring inevitably resulted in the motion of the electrolyte being transmitted in diminished velocity to the electrode surface. It would, therefore, be desirable to provide a structure for use in such cells which would result in an optimum stirring of the electrolyte.

A problem with the prior art methods and apparatus for electro-refining or electro-forming, (as described above), is that these methods and apparatus are not adapted for the production of "square" holes.

SUMMARY OF THE INVENTION

AIMS OF THE INVENTION

One object, therefore, of this invention is the provision of a liquid electrolyte battery in which, because of the reduction in internal resistance, ease of both charging and discharging are appreciable.

Another object of this invention is to provide utility load smoothing with storage batteries where maximum efficiency requires balancing of resistances so that more power can be recovered.

Another object of this invention is to provide means for establishing a magnetic field within an electrolytic cell for circulating the electrolyte therein when current is flowing between the electrodes in the cell.

A further object of this invention is to provide permanent magnets within an electrolytic cell between the plates forming the electrodes of the cell or battery for circulating electrolyte in the cell when current is flowing between the electrodes.

A still further object of this invention is to provide means for establishing a magnetic field within an electrolytic cell for circulating the electrolyte when current is flowing between the electrodes in the cell and arranging the means for establishing the magnetic field between the plates forming the electrodes in order to space and maintain the plates a fixed distance apart.

Yet another object of this invention is to provide an improved electrolysis apparatus where circulation of electrolyte is optimized.

Still another object of this invention is the provision of an electromachining apparatus which is specially adapted to produce small parts.

STATEMENTS OF INVENTION

By this invention, an ion-permeable sheet magnet spacer is provided for an electrochemical apparatus, the spacer comprising a perforated or ion-permeable, relatively-thin, synthetic plastic material sheet having two opposed faces and having a plurality of magnets completely embedded in both opposed faces thereof and including at least four vertically-upwardly slanting slits extending at an upwardly-sloping angle along each of the two opposed faces and also extending transversely through the spacer between the two opposed faces, preferably having a width of about 2 to about 5 mm, thereby to provide greater combined flow and mixing of electrolyte through the spacer.

This invention also provides an improvement in a lead acid storage battery having a plurality of groups of electrodes each comprising positive and negative plates with interposed separators of a size slightly smaller than the size of the plates, the separators of the improved battery each comprising an ion-permeable sheet magnet spacer comprising a perforated or ion-permeable, relatively-thin, synthetic plastic material sheet having two opposed faces and having a plurality of magnets completely embedded in both opposed faces thereof and including at least four vertically-upwardly slanting slits extending at an upwardly-sloping angle along each of the two opposed faces and also extending transversely through the spacer between the two opposed faces, preferably having a width of about 2 to about 5 mm, thereby to provide greater combined flow and mixing of electrolyte through the spacer.

This invention also provides an improvement in an electrolytic cell wherein an electrolyte is electrolyzed between positive and negative cells, the diaphragm for use in such improved electrolytic cell comprising an ion-permeable sheet magnet spacer comprising a perforated or ion-permeable, relatively-thin, synthetic plastic material sheet having two opposed faces and having a plurality of magnets completely embedded in both opposed faces thereof, and including at least four vertically-upwardly slanting slits extending at an upwardly-sloping angle along each of the two opposed faces and also extending transversely through the spacer between the two opposed faces, preferably having a width of about 2 to about 5 mm, thereby to provide greater combined flow and mixing of electrolyte through the spacer.

This invention also provides an improvement in apparatus for removing material from electrically-conducting substances by electrochemical attack which includes an anode and a cathode, the anode constituting the piece to be electro-machined or electro-refined, the improved apparatus including a spacer between the anode and cathode, the spacer comprising an ion-permeable sheet magnet spacer comprising a perforated or ion-permeable, relatively-thin, synthetic plastic material sheet having a plurality of magnets completely embedded in both opposed faces thereof and including at least four vertically-upwardly slanting slits extending at an upwardly-sloping angle along each of the two opposed faces and also extending transversely through the spacer between the two opposed faces, preferably having a width of about 2 to about 5 mm, thereby to provide greater combined flow and mixing of electrolyte through the spacer.

The present invention also provides a method for electrochemically etching fine units in a circuit board or in an electronic chip which comprises: suitably placing a spacer comprising a perforated or ion-permeable sheet magnet spacer in an electrochemical apparatus, the spacer comprising a perforated or ion-permeable, relatively thin, synthetic plastic material sheet having a plurality of magnets embedded in both opposed faces thereof and including at least four vertically-upwardly slanting slits extending at an upwardly-sloping angle along each of the two opposed faces and also extending transversely through the spacer between the two opposed faces; and causing the electrolyte to mix and flow through the spacer in such electrochemical etching apparatus by the action of the magnetic field derived from the embedded magnets.

OTHER FEATURES OF THE INVENTION

The magnets may be either ceramic magnets, or Fe magnets, or $SmCo_5$ magnets. The synthetic plastic material may be any suitable resistive synthetic plastics material, preferably polyvinylchloride or polyethylene.

The upwardly sloping angle of the slits is the angle of the vortex created by the field (right hand rule force) which causes a procession of the flow from the vertical to the vortex with an increased velocity and an angle from the vertical and as determined by the strength of the field and the current density drain, preferably about 30° to about 60°.

In the improved lead acid storage battery embodiment of this invention, the anode may be a $PbO_2$ plate, the cathode may be a Pb plate, the electrolyte may be $H_2SO_4$ and the spacer may be a perforated sheet of polyvinylchloride or polyethylene having Fe magnets, or $SmCo_5$ magnets completely embedded therein.

The battery case preferably is provided with a thin synthetic plastic (e.g. polyethylene) liner. Preferably, the outside frame is also formed of silicon steel, and the battery is provided with silicon steel lateral, longitudinally-extending straps. The upwardly sloping angle of the slits is the angle of the vortex created by the field (right hand rule force) which causes a procession of the flow from the vertical to the vortex with an increased velocity and an angle from the vertical and as determined by the strength of the field and the current density drain, preferably from about 30° to about 60°.

In the improved electrolyte cell embodiment of this invention, the anode may be carbon, the cathode may be perforated steel, and the spacer may be a perforated sheet of polyvinylchloride or polyethylene, having Fe magnets, or $SmCo_5$ magnets completely embedded therein. The upwardly sloping angle of the slits is the angle of the vortex created by the field (right hand rule force) which causes a procession of the flow from the vertical to the vortex with an increased velocity and an angle from the vertical and as determined by the strength of the field and the current density drain, preferably from about 30° to about 60°.

In the electrochemical machining embodiment of this invention, which can also be used for etching fine lines on a circuit board or on an electronic chip, (i.e. electrochemical etching), where there is less undercutting of masks and faster production, the cathode may be vertically disposed, and the anode may be horizontally disposed below the cathode, a hot electrolyte is adapted to be rapidly stirred within the apparatus, and the spacer may be a perforated sheet of polyvinylchloride or polyethylene having Fe magnets, or $SmCo_5$ magnets completely embedded therein. The upwardly sloping angle of the slits is the angle of the vortex created by the field (right hand rule force) which causes a procession of the flow from the vertical to the vortex with an increased velocity and an angle from the vertical and as determined by the strength of the field and the current density drain, preferably from about 30° to about 60°.

In one manner of production of the spacer of this invention, small ceramic magnets are placed on one face of a perforated synthetic plastic sheet, and then a very thin synthetic plastic sheet is superposed thereover and is integrally united with the base synthetic plastic sheet thereby completely embedding the magnets. The magnets must be embedded within both faces of the synthetic plastic sheet. If the synthetic plastic sheet is a thermoplastic material, e.g. polyethylene, the thin synthetic plastic sheet may be milled over the emplaced magnets.

In the method of the invention, the upwardly sloping angle of the slits as the angle of the vortex created by the field (right hand rule force) which causes a procession of the flow from the vertical to the vortex with an increased velocity and an angle from the vertical and as determined by the strength of the field and the current density drain, preferably from about 30° to about 60°. The method also includes the step of adding indifferent paramagnetic ions to said electrolyte, preferably $Cr^{+3}$ or $Mn^{+2}$ or stable, soluble free radicals or other indifferent paramagnetic solutes.

GENERALIZED DESCRIPTION OF THE INVENTION

Thus, the present invention is based on the discovery that, in the embodiment of a battery, by the use of the magnetic separators as described above, the reduction in internal resistance effect (up to about 40%) is proportional to the current density and the magnetic field. It is preferred that the battery be a high drain battery. High drain batteries have large density differences. This provides high convective velocities which, in turn, provide larger convective (depolarizing or reduction of internal resistance) flows magnified by a magnetohydrodynamic effect, which is caused by the permanent magnets in the spacer of an embodiment of this invention coupled with the angularly-arrayed slits.

Although only about 0.1 T can be achieved, since the drain is high, the convective flow of electrolyte is high, and the configuration of electrolyte space favours internal resistance, the reduction in internal resistance both charging and discharging should be appreciable.

Most electrolysis cells use natural convection to lower internal resistance. When the spacers of this invention are used in an electrolysis cell, improvement is provided since the natural convection allows, (by the application of the right-hand rule), a cross-electrode stirring which is the greatest directly on the surface of the electrodes.

The spacer of this invention includes at least four slanting slits therethrough. The slits should be about 2 to about 5 mm wide. The purpose of the slits is to allow the upwardly spiralling electrolyte pass through the spacer. The spacer is of a shape similar to that of the electrodes, but is of smaller dimensions, which allows the magnetic field around the edge to circulate the electrolyte.

The battery case should include a thin silicon steel case with straps across the top around the outside to complete the magnetic circuit. The battery case is preferably provided with a thin plastic (e.g. polyethylene liner) to avoid corrosion of the battery case.

Further, in another embodiment, an indifferent paramagnetic electrolyte is added to the electrolyte to increase further the stirring and to lower internal resistance (concentration polarization). Such paramagnetic electrolyte is drawn into the magnetic field and contributes about 25% more to the stirring effect of the electrolyte as the hydrodynamic effect due to the magnetic field. It is believed that there is a synergistic effect between the paramagnetic law and the magnetic field along with the slanting slits in the separators. Any indifferent paramagnetic ion, or one which is not indifferent as long as the deposition on an electrode does not cause detrimental effect, e.g. pressure discharge, loss of active material, etc. may be used. Suitable such paramagnetic ions include $Cr^{+3}$ and $Mn^{+2}$. Reductions in small cells of up to about 40% in impressed voltage to produce a given current density in 0.6 T field have been produced.

Electrolytic machining or electrochemical machining results when the stock is made the anode (it loses substance to the solution) and the shape required is made the cathode. In practice, hot, strong electrolyte is pumped at high speed between, e.g. a square cathode which is kept at a fixed distance from the anode at first, and then as the square hole is electrochemically machined in the anode, the square cathode is advanced towards the anode. The higher the conductivity, the better or truer the hole shape. Hot strong electrolyte is, therefore, pumped through the apparatus. If a spacer of this invention is included in the apparatus around the anode and the cathode, in an appropriate configuration, a strong magnetic field would speed the process and true up the hole, slot, cut, etc. Thus, small, space-age parts with precision "square" holes, and electronic chips would be produced.

BRIEF DESCRIPTION OF THE DRAWINGS

References will now be made to the accompanying drawings wherein like reference numbers throughout the various figures denote like elements and wherein.

DESCRIPTION OF PREFERRED EMBODIMENTS

Figure 1:
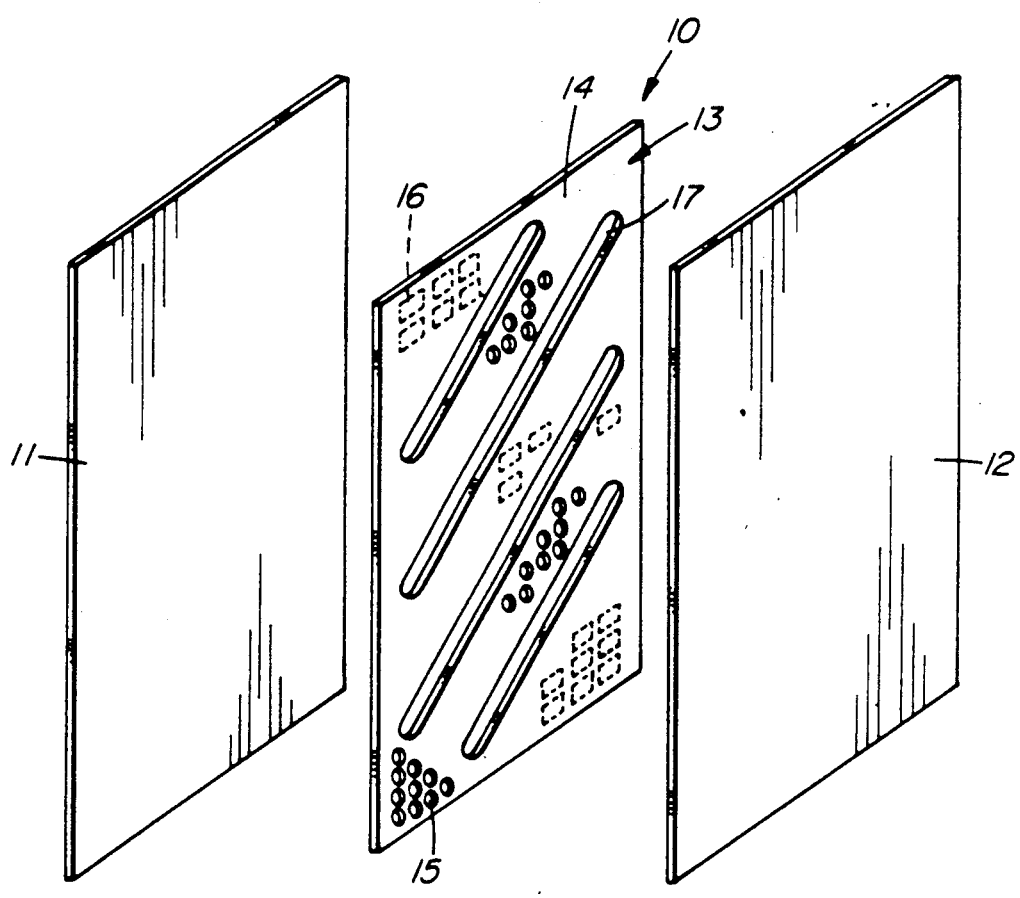
FIG. 1 is a schematic representation of two electrodes and an interposed spacer of a lead-acid battery embodying the principles of this invention.

Description of FIG. 1

As seen schematically in FIG. 1, battery 10 includes a plurality of cathodes 11 which may each comprise a plate of spongy lead, and a plurality of anodes 12 which may comprise a $PbO_2$ plate. Only one anode 12/cathode 11 pair, separated by a spacer 13 is shown, but in practice there would be a plurality of such anode/cathode pairs. Between each adjacent anode 12/cathode 11 and cathode 11/anode 12 is an ion permeable or a perforated spacer 13 of an embodiment of this invention, e.g. an ion permeable or a perforated thin sheet of polyvinyl chloride or polyethylene 14 provided with perforations 15 therein or being porous.

Each spacer is provided with a plurality of magnets 16, e.g. ceramic magnets or Fe magnets or $SmCO_5$ magnets completely embedded in each face of the thin sheet 14. Each spacer is also provided with at least four upwardly-slanting slits 17 passing therethrough. The slits are preferably about 2 to about 5 mm in width. The angle of inclination of these slits (which range from 30° to 60°) is determined by the strength of the field and the current density drawn. This angle is the angle of the vortex created by the field (right-hand rule force) which causes a precession of the flow from vertical to a vortex with an increased velocity and an angle from the vertical as it hits the spacer. To allow the vortex of the electrolyte to pass through uninhibited by a need to find its way around the spacer 13, the electrolyte passes through the slits 17. This reduces still further the internal resistance.

Figure 2:
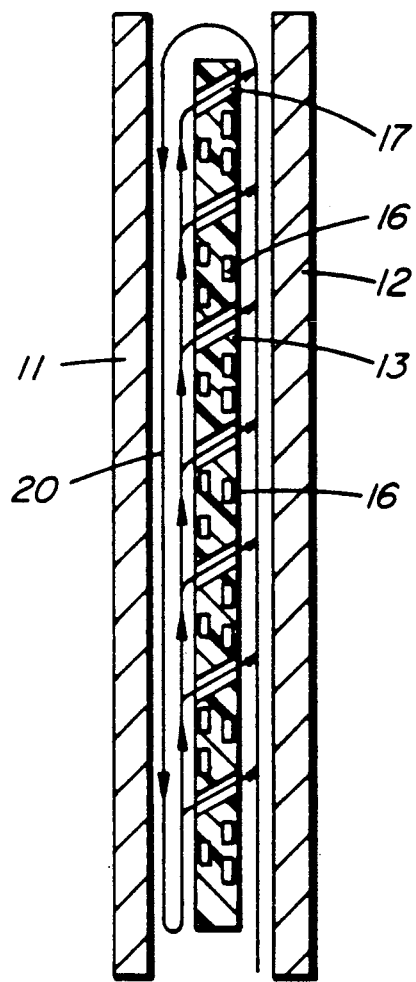
FIG. 2 is a schematic cross-sectional view of the convective streams in the electrolyte in a lead-acid battery of the type shown schematically in FIG. 1, namely an anode and a cathode separated by the spacer of this invention.

Description of FIG. 2

The convective stream in the electrolyte as seen in FIG. 2 shows (by arrows 20) that the electrolyte travels downwardly adjacent the cathode 11, then upwardly adjacent the spacer 13, and then upwardly adjacent the anode 12. The vortex stream of the electrolyte is seen to pass through the slits 17 in the spacer 13 to provide an increase of 5% to 10% in the flow over that where the slits are not provided.

Figure 3:
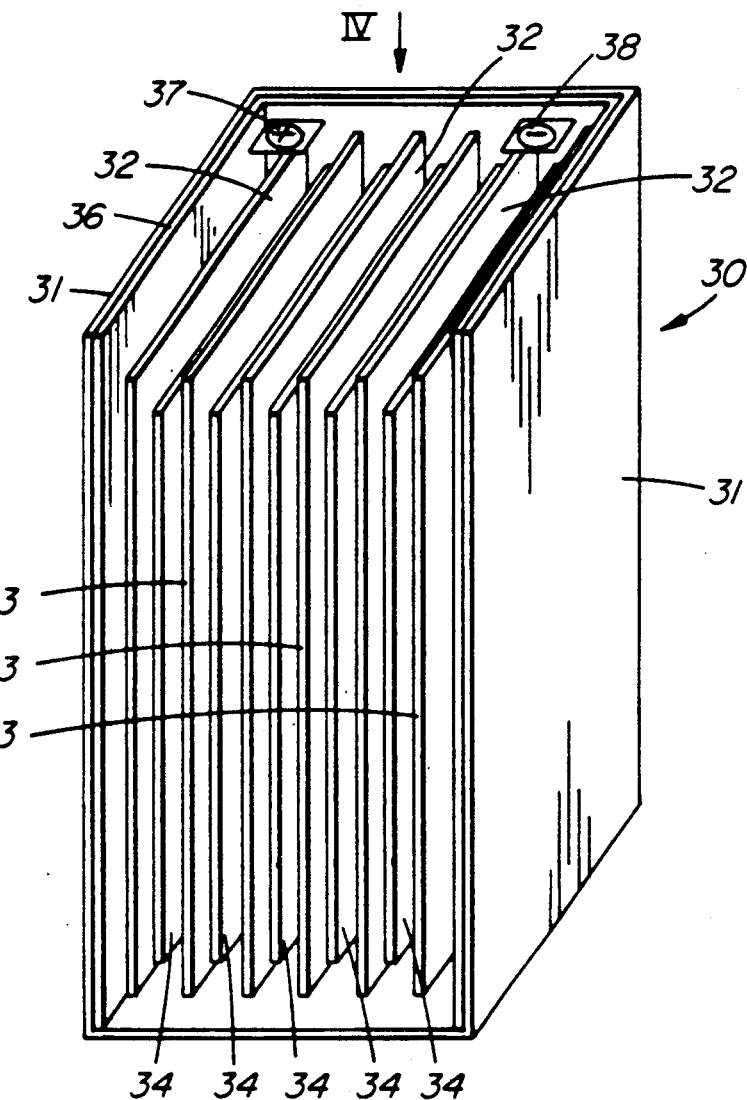
FIG. 3 is a schematic isometric view of a lead-acid-type cell embodying the principles of the present invention.

Description of FIG. 3

Figure 4:
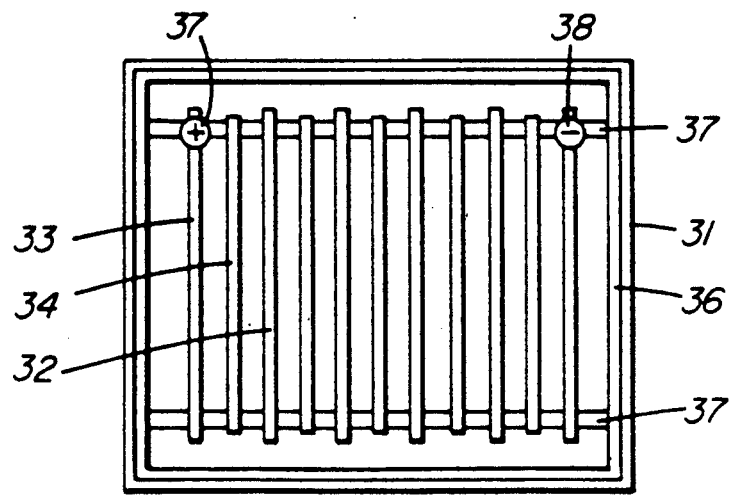
FIG. 4 is a top plan view of the embodiment shown in FIG. 3.

As seen in FIGS. 3 and 4, the lead-acid-type cell 30 includes a casing 31 provided with a plurality of spaced-apart $PbO_2$ plates 32 providing the anode, the terminal anode plate 32 being provided with an anode post 37, and a plurality of interleaved, spaced-apart Pb plates, providing the cathode 33, the terminal cathode plate 33 being provided with a cathode post 38. Connections between pairs may also be effected in other ways. The casing 31 is formed of silicon steel to provide a good magnetic environment. Within the casing 31 there is a thin liner 36 of polyethylene to avoid corrosion of the silicon steel casing 31. The silicon steel casing 31 allows more magnetic current per area. Straps 37, also of silicon steel, cross the top of the casing 31 to complete the magnetic circuit. A plurality of spaced-apart perforated sheet magnet spacers 34, comprising the spacer of an embodiment of this invention, including the diagonal slits, for such electrochemical apparatus is provided to separate adjacent anode 33/cathode 32 and cathode 32/anode 33 pairs. The electrolyte for this type of cell is sulfuric acid. The casing 31 of the battery may also be made into a permanent magnet, by incorporation of a magnetic material on, or by fusing of a magnetic sheet to the casing 31.

The operation of the lead-acid-type cell shown in FIGS. 3 and 4 is more efficient than the operation of a similar cell which does not include the perforated sheet magnets 34 provided with the upwardly slanting slits 17 because of the reduction in internal resistance effects.

Figure 5:
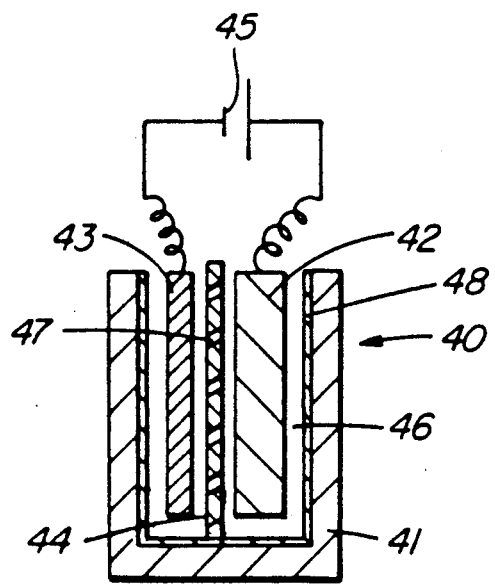
FIG. 5 is a schematic representation of an electrolysis cell embodying the principles of the present invention.

Description of FIG. 5

As seen in FIG. 5, the electrolysis cell 40 includes a casing 41, within which are placed an anode plate 42 and a cathode plate 43. A diaphragm 44, in the form of a perforated sheet magnet comprising the spacer of an embodiment of this invention including the slits 47 for such electrochemical apparatus, is disposed between the anode 42 and the cathode 43. The spacer need not be perforated, but it may alternatively be made out of an ion-exchange membrane. It is essential, however, to include the diagonal slits 47. When the electrolysis cell 40 is connected to a D.C. power source 45, and an electrolyte 46 is placed therein, electrolysis occurs. The casing 41 of the electrolysis cell may be formed of silicon steel with a polyethylene lining 40 as described for the battery of FIG. 4. The casing may also be made into a permanent magnet by incorporation of magnetic material or by fusing of a magnetic sheet to the casing.

For example, if an aqueous solution of NaCl is the electrolyte, a more efficient production of $Cl_2 \uparrow$ at the anode and Na (which reacts with the water to form NaOH and $H_2 \uparrow$) at the cathode takes place compared to a similar electrolysis in a cell, e.g. Nelson cell, a Vorce Cell, or a Hooker cell, which merely provides a non-magnetic continuous diaphragm, (which may also have ion-permeable properties), for the separation of the anode from the cathode, and which therefore does not contain the perforated sheet magnet diaphragm 44 with the diagonal slits 47 therethrough. This improvement is due principally to cross-electrode stirring.

Figure 6:
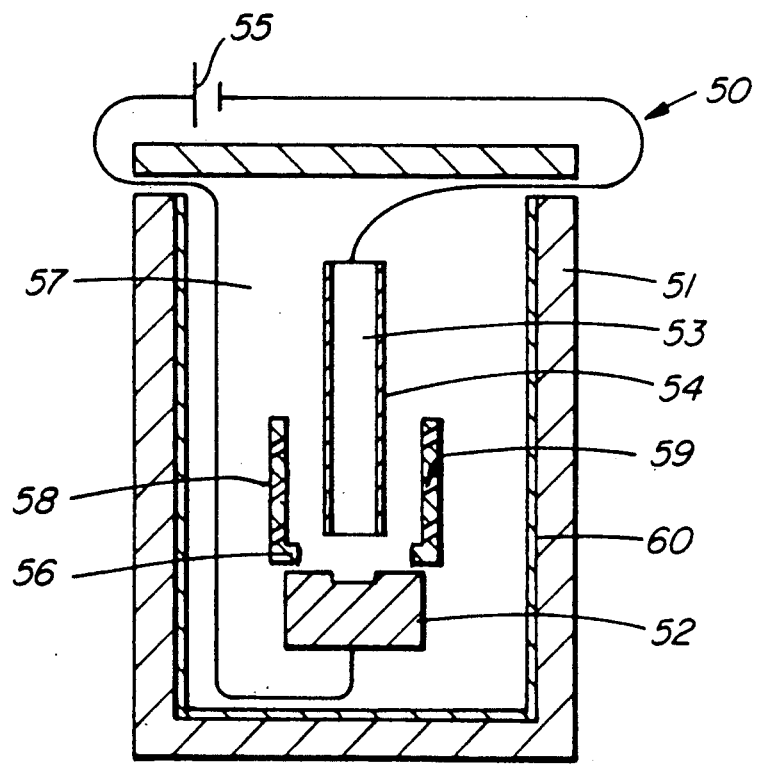
FIG. 6 is a schematic representation of an electro-machining cell embodying the principles of the present invention.

Description of FIG. 6

As seen in FIG. 6, the electro-machining cell 50 includes a covered casing 51 within which is placed a suitably-oriented (preferably horizontally-oriented) anode 52 (constituting the piece to be electro-machined) and a vertically oriented cathode 53, provided with a sheathing 54 of insulation except at the bottom working area. Disposed between the anode 52 and the cathode 53, is an open bottom horizontally-oriented spacer 56 and a pair of enclosing, vertically-oriented spacers 58, each in the form of a perforated sheet magnet comprising the spacer of an embodiment of this invention, including the diagonal slits 59 therethrough, for such electrochemical apparatus.

The casing 51 of the electro-machining cell 50 may be formed of silicon steel with a polyethylene lining 60 as described for the battery of FIG. 4. The casing 51 of the cell may be made into a permanent magnet, or a sheet magnet may be fused to the casing.

When the anode 52 and cathode 53 are connected to D.C. power source 55, and a hot electrolyte 57 is rapidly stirred within the cell, a more efficient electro-machining of the anode 52 takes place than in a similar cell which does not contain the perforated sheet magnet spacer 58. This is because the presence of the magnetic field speeds up the process by speeding up the stirring.

EXAMPLE

One embodiment of the spacer, i.e., sheet magnet of this invention is produced as follows: A plurality of small magnets, e.g. ceramic magnets, Fe-magnets or $SmCo_5$ magnets are placed on both sides of a relatively thick non-absorbent polyethylene sheet (ten one thousanths of an inch) and a relatively thin non-absorbent polyethylene sheet (one one thousanths of an inch) is then melted over them thereby completely encasing the magnets. The four diagonal slits of about 2 mm to about 5 mm in width are then provided in the spacer. In some cases, the synthetic plastic material, e.g. polyethylene, may be made from an ion-permeable membrane of known type, e.g. an ion-permeable sheet, and the perforations may, therefore, be omitted.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A spacer for an electrochemical apparatus comprising an ion-permeable sheet magnet spacer comprising a perforated or ion-permeable, relatively thin, synthetic plastic material sheet having two opposed faces and having a plurality of magnets completely embedded in both opposed faces thereof and including at least four vertically-upwardly slanting slits extending at an upwardly-sloping angle along each of said two opposed faces and also extending transversely through said spacer between said two opposed faces, thereby to provide greater combined flow and mixing of electrolyte through the spacer.

2. The spacer of claim 1 wherein said slits have a width of from about 2 mm to about 5 mm.

3. The spacer of claim 1 wherein said upwardly-sloping angle is an angle of a vortex created by a magnetic field, which causes a procession of flow from a vertical orientation to said vortex with an increased velocity and at an angle from said vertical orientation and as determined by parameters of said magnetic field, said parameters consisting of the strength of said magnetic field and the current density drain of said magnetic field.

4. The spacer of claim 3 wherein the angle is about 30° to about 60°.

5. The spacer of claim 1 wherein said magnets are ceramic magnets.

6. The spacer of claim 1 wherein said magnets are Fe magnets.

7. The spacer of claim 1 wherein said magnets are $SnCo_5$ magnets.

8. The spacer of claim 1 wherein said synthetic plastic material is an electrically-and-chemically resistant synthetic plastics material, selected from the group consisting of polyvinylchloride and polyethylene.

9. The spacer of claim 8 is in the form of a perforated sheet.

10. The spacer of claim 9 is in the form of an ion-permeable sheet.

11. In a lead-acid storage battery having a plurality of groups, each comprising a positive and a negative plate with an interposed separator, the improvement whereby each said interposed separator comprises an ion-permeable sheet magnet spacer, said spacer comprising a perforated or ion-permeable, relatively thin, synthetic plastic material sheet having two opposed faces and having a plurality of magnets completely embedded in both opposed faces thereof and including at least four vertically-upwardly slanting slits, extending at an upwardly-sloping angle along each of said two opposed faces and also extending transversely through said spacer between said two opposed faces thereby to provide greater combined flow and mixing of electrolyte through the spacer.

12. The improved lead-acid-type storage battery of claim 11 wherein said slits have a width of about 2 mm to about 5 mm.

13. The improved lead-acid storage battery of claim 11 wherein said upwardly-sloping angle is an angle of the vortex created by a magnetic field which causes a procession of flow from a vertical orientation to said vortex with an increased velocity and at an angle from said vertical orientation and as determined by parameters of said magnetic field, said parameters consisting of the strength of said magnetic field and the current density drain of said magnetic field.

14. The improved lead acid storage battery of claim 13 wherein said upwardly sloping angle is from about 30° to about 60°.

15. The improved lead-acid storage battery of claim 11 having an anode and a cathode therein, wherein said anode is a $PbO_2$ plate, wherein said cathode is a Pb plate, wherein said electrolyte is $H_2SO_4$ and wherein said spacer is a perforated sheet of polyvinylchloride or polyethylene having Fe, or $SmCo_5$ magnets completely embedded therein.

16. The improved lead-acid storage battery of claim 15 including a casing made into a permanent magnet.

17. The improved lead-acid-type storage battery of claim 16 wherein said casing is formed of silicon steel; wherein said casing is provided with a thin synthetic polymer lining; and wherein a pair of silicon steel straps is provided across a top of said battery to complete a magnetic circuit within said battery.

18. The improved lead-acid storage battery of claim 15 wherein said electrolyte includes indifferent paramagnetic ions or other stable, free radicals, or other indifferent paramagnetic solutes therein.

19. The improved lead-acid storage battery of claim 18 wherein said indifferent paramagnetic ions are $Cr^{+3}$ or $Mn^{+2}$.

20. In an electrolytic cell wherein an electrolyte is electrolyzed between positive and negative cells, wherein the improvement comprises a diaphragm for use therein, said diaphragm comprising a perforated or ion-permeable sheet magnet spacer comprising a perforated or ion-permeable, relatively-thin, synthetic plastic material sheet having two opposed faces and having a plurality of magnets completely embedded in both opposed faces thereof and including at least four vertically-upwardly slanting slits extending at an upwardly-sloping angle along each of said two opposed faces and also extending transversely through said spacer between said two opposed faces, thereby to provide greater combined flow and mixing of electrolyte through the spacer.

21. The improved electrolytic cell of claim 20 wherein said slits have a width of about 2 mm to about 5 mm.

22. The improved electrolytic cell of claim 20 wherein said upwardly-sloping angle is an angle of the vortex created by a magnetic field which causes a procession of flow from a vertical orientation to the vortex with an increased velocity and at an angle from said vertical orientation and as determined by parameters of said magnetic field, said parameters consisting of the strength of said magnetic field and the current density drain of said magnetic field.

23. The improved lead acid-type of storage battery of claim 22 wherein said upwardly sloping angle is from 30° to 60°.

24. The improved electrolytic cell of claim 20 having an anode and a cathode therein, wherein said anode is carbon, wherein said cathode is perforated steel, and wherein said spacer is a perforated sheet of polyvinylchloride or polyethylene having Fe, or $SmCo_5$ magnets completely embedded therein.

25. The improved electrolytic cell of claim 20 wherein a casing thereof is made into a permanent magnet.

26. The improved electrolytic cell of claim 25 wherein said casing is formed of silicon steel; wherein said casing is provided with a thin synthetic polymer lining; and wherein a pair of silicon steel straps is provided across a top of said electrolytic cell to complete a magnetic circuit in said electrolytic cell.

27. The improved electrolytic cell of claim 20 wherein the electrolyte includes indifferent paramagnetic ions or other stable, free radicals, or other indifferent paramagnetic solutes therein.

28. The improved electrolytic cell of claim 27 wherein said indifferent paramagnetic ions are $Cr^{+3}$ or $Mn^{+2}$.

29. In apparatus for removing material from electrically-conducting substances by electrochemical attack which includes an anode and a cathode, the anode constituting the piece to be electromachined or electrorefined, wherein the improvement comprises a spacer alongside said anode and cathode, said spacer comprising an ion-permeable sheet magnet spacer comprising a perforated or ion-permeable, relatively thin, synthetic plastic material sheet having a plurality of magnets embedded in both opposed faces thereof and including at least four vertically-upwardly slanting slits, thereby to provide greater combined flow and mixing of electrolyte through the spacer.

30. The improved apparatus of claim 29 wherein said slits have a width of about 2 mm to about 5 mm.

31. The improved apparatus of claim 29 wherein the upwardly sloping angle of said slits is the angle of the vortex created by the field (right hand rule force) which causes a procession of the flow from the vertical to the vortex with an increased velocity and an angle from the vertical and as determined by the strength of the field and the current density drain.

32. The improved apparatus of claim 31 wherein said upwardly sloping angle is from about 30° to about 60°.

33. The improved apparatus of claim 29 wherein said cathode has a top and a bottom, which is vertically disposed and is sheathed in electrically-insulating material except at said bottom, working area; wherein said anode is horizontally-disposed below said cathode;

wherein a hot electrolyte is adapted to be rapidly stirred within the apparatus; and wherein said spacer is a perforated sheet of polyvinylchloride or polyethylene having Fe, or SmCo$_5$ magnets completely embedded therein.

34. The improved apparatus of claim 29 including a casing made into a permanent magnet.

35. The improved apparatus of claim 34 wherein said casing is formed of silicon steel; wherein said casing is provided with a thin synthetic polymer lining; and wherein a pair of silicon steel straps is provided across a top of said apparatus to complete a magnetic field in said apparatus.

36. The improved apparatus of claim 29 wherein said electrolyte includes different paramagnetic ions or other stable, free radicals, or other indifferent paramagnetic solutes therein.

37. The improved apparatus of claim 36 wherein said indifferent paramagnetic ions are $Cr^{+3}$ or $Mn^{+2}$.

38. A method for electrochemically etching fine units in a circuit board or in an electronic chip which comprises: suitably placing a spacer comprising a perforated or ion-permeable sheet magnet spacer in an electrochemical apparatus, the spacer comprising a perforated or ion-permeable, relatively thin, synthetic plastic material sheet having a plurality of magnets embedded in both opposed faces thereof and including at least four vertically-upwardly slanting slits extending at an upwardly-sloping angle along each of said two opposed faces and also extending transversely through said spacer between said two opposed faces; and causing the electrolyte to mix and flow through said spacer in such electrochemical etching apparatus by the action of the magnetic field derived from said embedded magnets.

39. The method of claim 38 including providing said slits of a width of about 2 mm to about 5 mm.

40. The method of claim 38 including providing said slits at an upwardly-sloping angle which is an angle of a vortex created by a magnetic field which causes a procession of flow from a vertical orientation to said vortex with an increased velocity and at an angle from said vertical orientation and as determined by parameters of said magnetic field, said parameters consisting of the strength of said magnetic field and the current density drain of said magnetic field.

41. The method of claim 40 including providing the sloping angle as about 30° to about 60°.

42. The method of claim 38 including an additional step of adding indifferent paramagnetic ions or other stable, free radicals, or other indifferent paramagnetic solutes to said electrolyte.

43. The method of claim 38 wherein said indifferent paramagnetic ions are $Cr^{+3}$ or $Mn^{+2}$.

* * * * *